(12) United States Patent
Tatsumi et al.

(10) Patent No.: US 9,870,632 B2
(45) Date of Patent: Jan. 16, 2018

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Daisuke Tatsumi, Kanagawa (JP); Takeshi Onishi, Kanagawa (JP); Hiroyuki Sayuda, Kanagawa (JP); Eisaku Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 136 days.

(21) Appl. No.: 14/716,943

(22) Filed: May 20, 2015

(65) Prior Publication Data
US 2015/0254884 A1    Sep. 10, 2015

Related U.S. Application Data

(63) Continuation of application No. PCT/JP2013/068195, filed on Jul. 3, 2013.

(30) Foreign Application Priority Data

Nov. 27, 2012   (JP) .................................. 2012-259006

(51) Int. Cl.
*G06T 11/00* (2006.01)
*G06T 11/60* (2006.01)
(Continued)

(52) U.S. Cl.
CPC ........ *G06T 11/60* (2013.01); *G06F 17/30259* (2013.01); *G06T 3/40* (2013.01); *G06T 11/001* (2013.01)

(58) Field of Classification Search
None
See application file for complete search history.

(56) References Cited

U.S. PATENT DOCUMENTS 6,401,105 B1 * 6/2002 Carlin ................ G06Q 10/0639
                                                    704/2
9,305,079 B2 * 4/2016 Starbuck ............. G06Q 10/107
(Continued)

FOREIGN PATENT DOCUMENTS

JP       10-003483 A      1/1998
JP       10-301946 A     11/1998
(Continued)

OTHER PUBLICATIONS

International Search Report for Corresponding PCT/JP2013/068195 dated Jul. 30, 2013.

*Primary Examiner* — Yingchun He
(74) *Attorney, Agent, or Firm* — Sughrue Mion, PLLC

(57) ABSTRACT

An information processing apparatus includes a selecting unit, a degree-of-association calculating unit, and a display. The selecting unit selects at least one of multiple components constituting electronic information. The degree-of-association calculating unit calculates the degree of association representing a strength of association between a different component associated with the component selected by the selecting unit and the selected component. The display displays associated-component information regarding the different component which is associated with the selected component, in a form based on the degree of association which is calculated by the degree-of-association calculating unit. When at least one of the components has a description indicating a conjunctive relation with the different component, the degree-of-association calculating unit associates the component with the different component.

19 Claims, 5 Drawing Sheets

(51) Int. Cl.
    *G06T 3/40*         (2006.01)
    *G06F 17/30*       (2006.01)

(56) References Cited

U.S. PATENT DOCUMENTS

| | | | |
|---|---|---|---|
| 2002/0052730 A1 | 5/2002 | Nakao | |
| 2002/0113802 A1* | 8/2002 | Card | G06F 3/04815 |
| | | | 345/619 |
| 2002/0129012 A1* | 9/2002 | Green | G06F 17/30616 |
| 2003/0123732 A1* | 7/2003 | Miyazaki | G06K 9/00449 |
| | | | 382/186 |
| 2004/0249802 A1* | 12/2004 | Okumura | G06F 17/30864 |
| 2008/0040315 A1* | 2/2008 | Auerbach | G06F 17/3056 |
| 2013/0097542 A1* | 4/2013 | Icho | G06F 17/30032 |
| | | | 715/769 |
| 2014/0114942 A1* | 4/2014 | Belakovskiy | G06F 17/30631 |
| | | | 707/706 |

FOREIGN PATENT DOCUMENTS

| | | |
|---|---|---|
| JP | 2002-169803 A | 6/2002 |
| JP | 2006-260569 A | 9/2006 |
| JP | 2007-310502 A | 11/2007 |
| JP | 2007-310503 A | 11/2007 |
| JP | 2008-134954 A | 6/2008 |
| JP | 2009-048598 A | 3/2009 |
| JP | 2009-086944 A | 4/2009 |
| JP | 2011-034504 A | 2/2011 |

\* cited by examiner

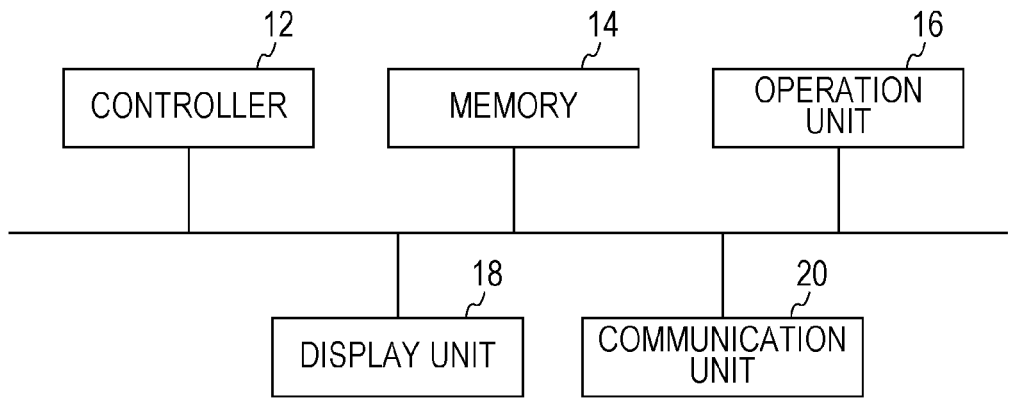
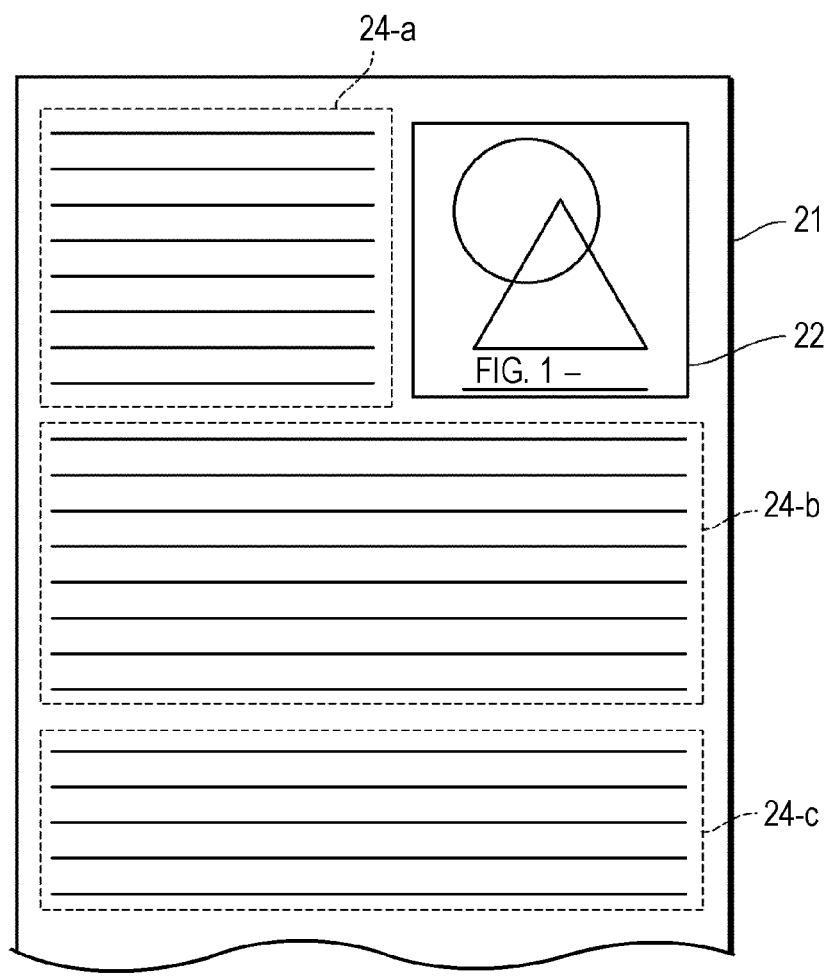

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from PCT International Application No. PCT/JP2013/068195 filed Jul. 3, 2013.

BACKGROUND (i) Technical Field

The present invention relates to an information processing apparatus and a non-transitory computer readable medium.

(ii) Related Art

There is a technique in which a component, such as a document or an image, included in an electronic document is associated with associated-component information about a different component, such as the title or a document related to the component, and in which the associated-component information is used to search for the component.

SUMMARY

According to an aspect of the invention, there is provided an information processing apparatus including a selecting unit, a degree-of-association calculating unit, and a display. The selecting unit selects at least one of multiple components constituting electronic information. The degree-of-association calculating unit calculates the degree of association representing a strength of association between a different component associated with the component selected by the selecting unit and the selected component. The display displays associated-component information regarding the different component which is associated with the selected component, in a form based on the degree of association which is calculated by the degree-of-association calculating unit. When at least one of the components has a description indicating a conjunctive relation with the different component, the degree-of-association calculating unit associates the component with the different component.

BRIEF DESCRIPTION OF THE DRAWINGS

Exemplary embodiment of the present invention will be described in detail based on the following figures, wherein:

FIG. 1 is a diagram illustrating an example configuration of an information processing apparatus according to an exemplary embodiment of the present invention;

FIG. 2 is a diagram illustrating example electronic information;

DETAILED DESCRIPTION

Figure 3:
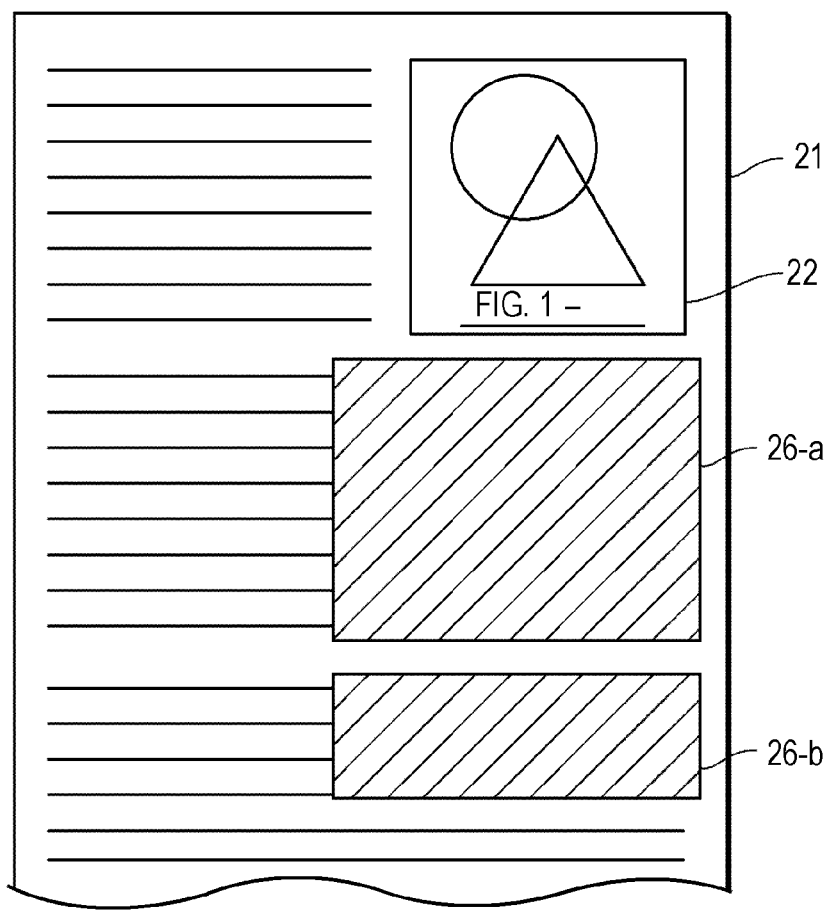
FIG. 3 is a diagram illustrating other example electronic information.

An exemplary embodiment of the present invention will be described below in detail on the basis of the drawings.

FIG. 1 is a diagram illustrating an example hardware configuration of an information processing apparatus 10 according to the present exemplary embodiment. As illustrated in FIG. 1, the information processing apparatus 10 according to the present exemplary embodiment includes, for example, a controller 12, a memory 14, an operation unit 16, a display unit 18, and a communication unit 20. These components are connected to one another via a bus or the like.

The controller 12 which is, for example, a program control device such as a central processing unit (CPU) operates according to programs installed in the memory 14.

The memory 14 includes, for example, a storage device, such as a read-only memory (ROM) or a random-access memory (RAM), and a hard disk. The memory 14 stores, for example, the programs performed by the controller 12 and various types of data. The memory 14 also functions as a work memory for the controller 12.

The operation unit 16 which includes a keyboard, a mouse, a button, and a touch panel receives an operation indicating an instruction from a user, and outputs the instruction information to the controller 12. The display unit 18 which is a display or the like displays information in accordance with an instruction supplied from the controller 12.

The communication unit 20 which is a network interface such as a local-area network (LAN) card receives/transmits various types of information via a communication unit, such as a LAN or a wireless communication network.

In the present exemplary embodiment, the memory 14 of the information processing apparatus 10 stores, in advance, electronic information 21 including components, such as a character string, a figure (including graphics, a picture, and a photograph), and a table (see FIG. 2).

The electronic information 21 is electronic information in which combinations of one or more components, such as a character string, a figure (including graphics, a picture, and a photograph), and a table, are disposed in one or more pages. Specifically, examples of the electronic information 21 include a scan document obtained by scanning a paper document, a document edited using a word processor or the like, a spread sheet edited using spread sheet software, a drawing, and a web page. FIG. 2 is a diagram illustrating example electronic information 21 in which multiple components are disposed. The electronic information 21 illustrated in FIG. 2 includes a picture area 22 in which a picture or the like is illustrated, and text areas 24 (24-a, 24-b, and 24-c) obtained by dividing a document into paragraphs, which serve as components. Pixel values in the electronic information 21 are expressed using the red-green-blue (RGB) color space. Not only is the above-described Portable Document Format (PDF) format or the like used in the electronic information 21, but also the electronic information 21 may include, for example, a scan image and an image captured with a camera. The electronic information 21 may include only images or only figures. The electronic information 21 may be obtained by receiving it from another apparatus via the communication unit 20, or may be obtained on the basis of a scan result from a scanner (not illustrated).

In the present exemplary embodiment, the controller 12 of the information processing apparatus 10 associates components included in the electronic information 21 stored in the memory 14 with one another, and calculates degrees of association representing strength of the association among associated components. When a user selects a component (for example, clicks on a component with a mouse), the operation unit 16 receives the selection operation, and outputs the selection operation information to the controller 12. The selection operation may be a tapping operation using a finger, or an operation using biological information such as a line of sight. The controller 12 outputs an instruction to display information (hereinafter referred to as associated-component information 26) about other components associated with the component selected by the user, at positions determined on the basis of the position of the component selected by the user, to the display unit 18 on the basis of the selection operation obtained from the operation unit 16. At that time, each piece of the associated-component information 26 is displayed by the display unit 18 in a manner based on the degree of association between a corresponding one of other components associated with the component selected by the user and the selected component. FIG. 3 is a diagram illustrating an example in which associated-component information 26-*a* and associated-component information 26-*b* about other components associated with the picture area 22 are displayed in the case where a user selects the picture area 22. The associated-component information 26-*a* illustrated in FIG. 3 is associated-component information whose degree of association is high, and a component which is the source of the associated-component information 26-*a* is popped up without conversion. For the associated-component information 26-*b* whose degree of association is low, information obtained by extracting a part of a component which is the source of the associated-component information 26-*b*, or information generated from the component which is the source of the associated-component information 26-*b* is popped up in a display area which is smaller than that for the associated-component information 26-*a*. Other components associated with the selected component are not limited to components included in the same electronic information, and may be components included in other electronic information. Examples of a method of extracting a part of a component include extraction of a characteristic character string which indicates the description in the component, from the component. Examples of a method of generating information from a component include generating of a summary of the description of the component. In the case where the component is a picture area 22, for example, a figure, an image, or the like included in the picture area 22 is displayed as a thumbnail, whereby the associated-component information 26 is displayed in a small display area. Thus, the associated-component information 26-*a* having a high degree of association is displayed in a display area larger than that for the associated-component information 26-*b* having a lower degree of association. It is possible for the user to obtain the associated-component information 26 about other components associated with the selected component and to easily grasp the degree of association between the selected component and each piece of the associated-component information 26.

Figure 4:
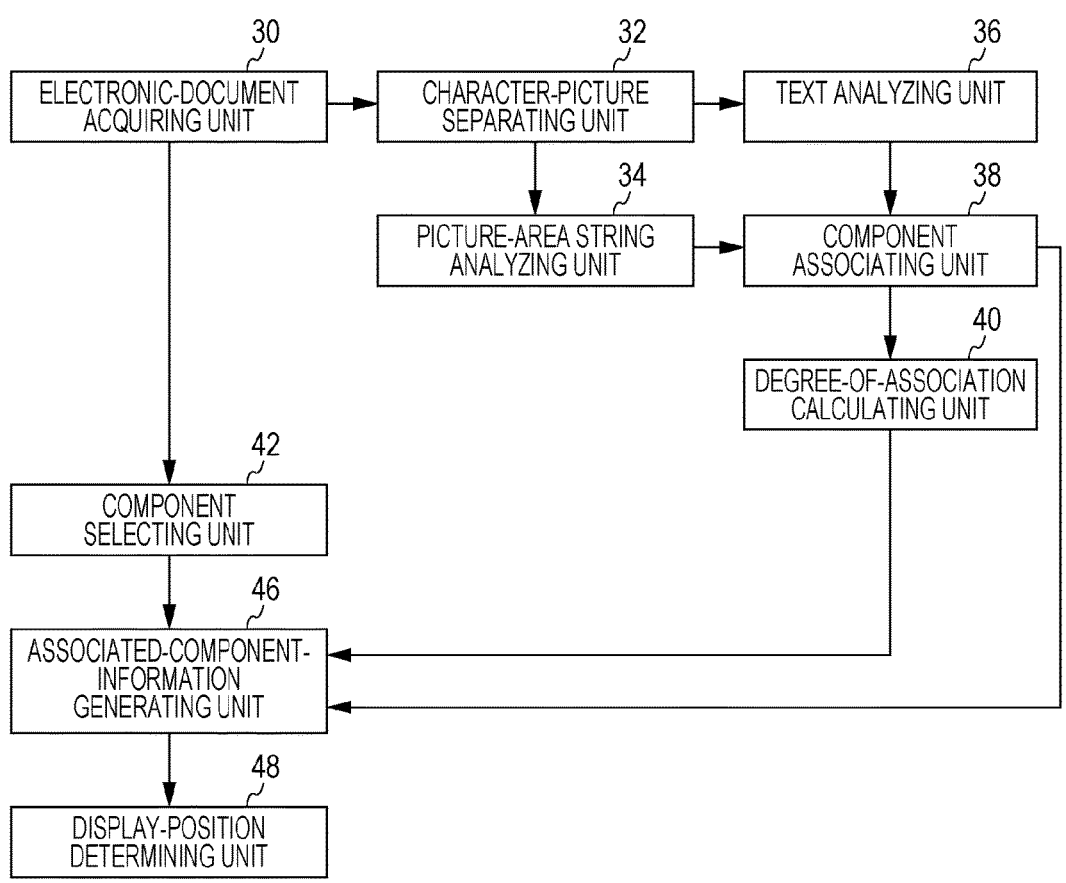
FIG. 4 is a functional block diagram illustrating example functions achieved by the information processing apparatus according to the exemplary embodiment of the present invention.

Functions achieved by the information processing apparatus 10 according to the present exemplary embodiment will be described below. FIG. 4 is a functional block diagram illustrating example functions achieved by the information processing apparatus 10. As illustrated in FIG. 4, the information processing apparatus 10 according to the present exemplary embodiment functionally includes, for example, an electronic-document acquiring unit 30, a character-picture separating unit 32, a picture-area string analyzing unit 34, a text analyzing unit 36, a component associating unit 38, a degree-of-association calculating unit 40, a component selecting unit 42, an associated-component-information generating unit 46, and a display-position determining unit 48. In the information processing apparatus 10 according to the present exemplary embodiment, functions other than the functions illustrated in FIG. 4 may be achieved. These functions are achieved in such a manner that the controller 20 of the information processing apparatus 10 which is a computer executes a program which is installed in the memory 14 of the information processing apparatus 10 and which includes instructions corresponding to these functions. This program is supplied to the information processing apparatus 10, for example, via a computer-readable information storage medium, such as an optical disk, a magnetic disk, a magnetic tape, a magneto-optical disk, and a flash memory, or via a communication unit such as the Internet.

The information processing apparatus 10 according to the present exemplary embodiment makes associations among components included in the electronic information 21 on the basis of the electronic information 21 stored in advance in the memory 14 of the information processing apparatus 10, and calculates degrees of association which represent strength of the association among components associated with one another.

Figure 5:
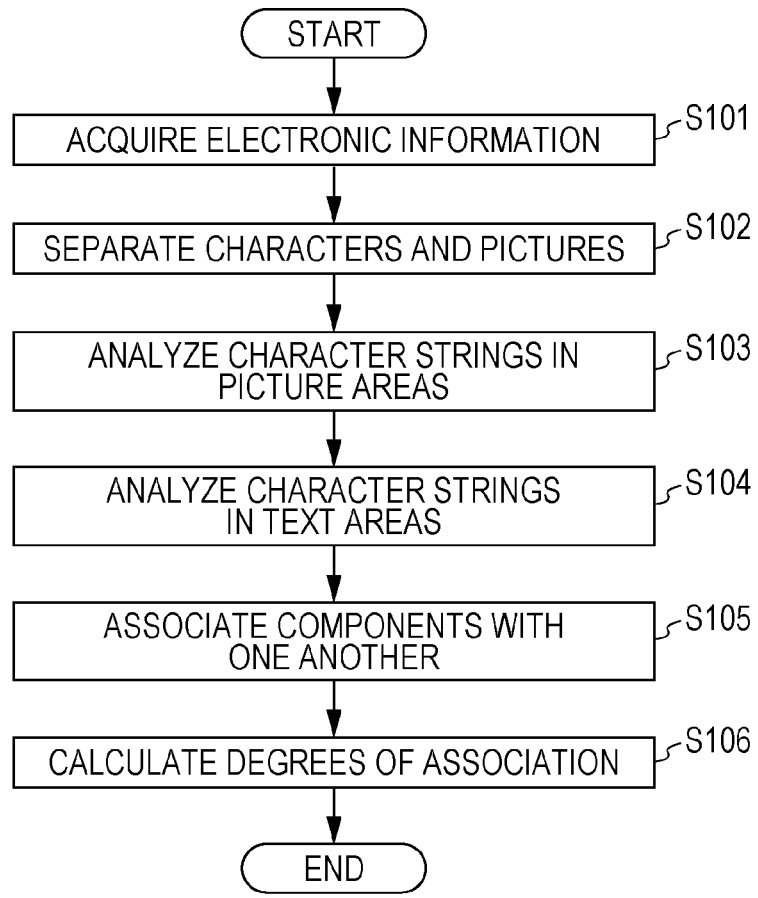
FIG. 5 is a diagram illustrating an example flow of a process performed by the information processing apparatus according to the exemplary embodiment of the present invention.

An example flow of processes of associating the components included in the electronic information 21 with one another and of calculating degrees of association, which are performed by the information processing apparatus 10 according to the present exemplary embodiment, will be described by referring to the flowchart illustrated in FIG. 5.

The electronic-document acquiring unit 30 acquires electronic information 21 stored in the memory 14 of the information processing apparatus 10 (S101).

The character-picture separating unit 32 performs character-picture separating processing on the electronic information 21 acquired by the electronic-document acquiring unit 30 (S102).

The character-picture separating unit 32 uses a known layout analysis technique or a known technique for character-picture separating processing to divide the electronic information 21 into multiple component areas, such as a title area, a main-body area, a header/footer area, and a picture area 22. Specifically, for example, the character-picture separating unit 32 performs character-picture separating processing on image data obtained by converting the RGB value of each of the pixels in the electronic information 21 into a YCbCr value. First, color information of the image data expressed using the YCbCr color space is used to separate characters and pictures. Specifically, after determination of the background color, a feature value is calculated for each piece of image data (a group of pieces of image data or objects) which does not correspond to the background color. The number of colors, color distribution, the size and shape, and the like are used as a feature value. Characters are characterized, for example, in that the number of colors is small and that the size is not large. Then, the image data expressed using the YCbCr color space is binarized, and areas in which black pixels are connected are extracted from the image data obtained through the binarization. On the basis of the size and the density of black pixels in each of the black-pixel connected areas in which black pixels are connected, picture areas and text areas are separated. Specifically, for example, a black-pixel connected area having a size equal to or larger than an area corresponding to the maximum of the font size used in a typical electronic document is specified as a picture area. A line segment having a large number of connected black pixels (run-length) is determined to be a ruled line, and a table is separated, for example, on the basis of arrangement of long run-lengths in the vertical direction and the horizontal direction and the number or the distribution of points of intersection. Further, paragraph areas are determined for an image subjected to the character determination processing. Specifically, histograms of black pixels in the vertical direction and the horizontal direction are obtained, and a character area is divided at a valley (that is, a point at which less black pixels are present, such as a point between paragraphs or lines) of a histogram or at a peak (that is, a point in which many black pixels are connected, such as a separator representing the end of an area) of a histogram. Furthermore, similar processing is repeatedly performed on the areas obtained through the division, whereby areas having a single paragraph or a single character line are obtained through division. Another method may be used to separate picture areas and text areas. In the present exemplary embodiment, a character string included in a figure, a table, a picture, or the like is regarded as a part of a picture area 22. An identification number (such as diagram 1, diagram 2, paragraph 1, or paragraph 2) for identifying an area is assigned to each of the picture areas and the text areas which are obtained through the separation and the division.

The picture-area string analyzing unit 34 obtains a picture area 22 including a diagram, from the electronic information 21 obtained in the character-picture separating processing performed by the character-picture separating unit 32, and further separates and extracts a character string included in the picture area 22. The picture-area string analyzing unit 34 analyzes the extracted character string by using a known morphological analysis or syntax analysis (S103). Specifically, for example, the picture-area string analyzing unit 34 separates a character portion from a picture portion by combining boundary detection through edge detection (in which a steep boundary is recognized as a boundary between a picture portion and characters in the picture) with a determination circuit for, when adjacent boundaries satisfy a certain condition, recognizing pixels surrounded by the boundaries as characters. In the case of, for example, a scan image and a photographing image which include no character codes, character codes are obtained by using an optical-character-reader (OCR) to search for character strings in the picture areas and character strings in the text areas. In the case of a document which already includes character codes, each of the character codes is associated with a corresponding one of the text areas and the picture areas. Then, the picture-area string analyzing unit 34 performs morphological analysis on a separated character string, thereby segmenting the character string into morphemes and specifying the part of speech or the conjugated form of each of the morphemes. The picture-area string analyzing unit 34 performs syntax analysis on the separated character string, and specifies modification or the like between clauses.

The text analyzing unit 36 obtains a text area 24 from the electronic information 21 obtained in the character-picture separating processing performed by the character-picture separating unit 32, and uses a known morphological analysis or syntax analysis to analyze a character string included in the text area 24 (S104). In the present exemplary embodiment, the text area 24 is a character area, such as a title area or a main-body area, which does not include a character string included in a picture area 22. In the present exemplary embodiment, the text areas 24 are obtained by dividing the main-body area into paragraphs. Specifically, for example, the text analyzing unit 36 performs a known character recognition technique on a character string in each of the obtained text areas 24 so as to recognize characters. Then, the text analyzing unit 36 performs morphological analysis on the character string in the text area 24 so as to segment the character string in the text area 24 into morphemes and specify the part of speech or the conjugated form of each of the morphemes. The text analyzing unit 36 performs syntax analysis on the character string in the separated text area 24, and specifies modification or the like between clauses.

The component associating unit 38 associates components with one another on the basis of the result obtained through analysis performed by the picture-area string analyzing unit 34 and the text analyzing unit 36 (S105). The component associating unit 38 compares a character string in a component with a character string in another component, and determines whether or not the same character string is present. If the same character string is present, the component associating unit 38 associates these components which include the same character string with each other. In addition to the presence or absence of the same character string, the component associating unit 38 may calculate a frequency of occurrence and associate components with each other. Alternatively, the component associating unit 38 associates components with each other when a description indicating a parallel relation, a dependency relation, a cause-effect relation, or the like between the components is present in a character string in a text area 24.

An example method of associating components with each other will be described. For example, when a picture area 22 is a diagram or the like, the component associating unit 38 determines whether or not the diagram number illustrated in the diagram analyzed by the picture-area string analyzing unit 34 matches a character string in a text area 24 analyzed by the text analyzing unit 36. If the diagram number matches the character string, the component associating unit 38 associates the text area 24 in which the diagram number is included as a character string with the picture area 22 corresponding to the diagram number. Instead of a diagram number, a caption in a diagram may be used.

The component associating unit 38 determines whether or not a character string in a picture area 22 analyzed by the picture-area string analyzing unit 34 matches a character string in a text area 24 analyzed by the text analyzing unit 36. If the two character strings match each other, the component associating unit 38 may associate the text area 24 in which the character string in the picture area 22 is included as a character string with the picture area 22.

When a description (such as "FIG. A and FIG. B are . . . ") indicating a parallel relation, a principal-subordinate relation, a cause-effect relation, and the like between picture areas is present in a character string in a text area 24, the component associating unit 38 may associate the picture areas for which the relation is described with each other. In addition, when a description (such as a description in which a conjunctive, such as "Therefore" or "However", is present at the top of a paragraph) indicating a parallel relation, a principal-subordinate relation, a cause-effect relation, or the like between text areas is present, the component associating unit 38 may associate the text areas including the description of the relation with each other. Specifically, for example, the component associating unit 38 extracts a conjunctive located at the top of a text area 24. When the conjunctive is a conjunctive indicating a dependency relation, a cause-effect relation, or the like, the component associating unit 38 associates the text area 24 including the conjunctive with the immediately preceding text area 24.

The component associating unit 38 may perform the associating process by using either one of the above-described methods, or may perform the associating process by combining some of the methods together.

The degree-of-association calculating unit 40 calculates the degree of association between components associated with each other by the component associating unit 38 (S106). The degree of association is an index value indicating the strength of association between associated components. For example, when components are associated with each other because it is determined that the same character string is present in the components, the degree-of-association calculating unit 40 calculates the degree of association on the basis of the frequency of occurrence of the same character string in the components. The degree-of-association calculating unit 40 may extract frequently-appearing words and frequently-appearing character strings in each of the components and may calculate the degree of association on the basis of the degree of similarity of a combination of the frequently-appearing words and the frequently-appearing character strings. Further, when components are associated with each other because a description indicating a parallel relation, a principal-subordinate relation, a cause-effect relation, or the like between the components is present in a text area, the degree-of-association calculating unit 40 may calculate the degree of association on the basis of which kind of conjunctive relation is present.

An example method of calculating the degree of association will be described. When a picture area 22 is associated with a text area 24 because a diagram number, a character string in a caption, or a character string in a diagram is included in the text area 24, the degree-of-association calculating unit 40 calculates the degree of association on the basis of the position at which the diagram number or the like is described. That is, the degree of association of the picture area 22 which corresponds to the diagram number or the like described at a position close to the top of the text area 24 is calculated so as to have a high value. When the position at which the diagram number or the like is described in the text area 24 is close to a position at which the picture area 22 corresponding to the diagram number or the like is disposed, the degree of association is calculated so as to have a high value. In the case where a picture area 22 is associated with a text area 24 because the diagram number, a character string in a caption, or a character string in a diagram is included in the text area 24, when the diagram number or the like is described many times in the text area 24, the degree-of-association calculating unit 40 calculates the degree of association so that the degree of association has a high value. A method of calculating the degree of association between text areas is similar. When a text area A is compared with a text area B, character strings which frequently appear, proper nouns, character strings used in picture areas, and the like are obtained from each of the text areas. In accordance with a matching (similarity) ratio of these character strings to the character strings used in the entire text area, the degree of association between the text area A and the text area B is calculated.

The degree of association may be defined as a value. For example, the degree of association R between a picture area 22 and a text area 24 may be defined by using $R=\alpha \cdot a + \beta \cdot b$ (where $\alpha$ and $\beta$ are weights), where the frequency of occurrence of the same character string is represented by a, and the positions of the same character string in the text area 24 are represented by b. The degree of association R between text areas 24 or between a text area 24 and a picture area 22 may be defined by using $R=\gamma \cdot c + \delta \cdot d$ (where $\gamma$ and $\delta$ are weights), where the degree of similarity of a combination of frequently-appearing words and frequently-appearing character strings is represented by c, and the conjunctive relation (a cause-effect relation, a master-subordinate relation, a parallel relation, or the like) is represented by d. In this case, the degree of association R is defined as a value from 0 to 1. The case where R=0 indicates no association, and the case where R is closer to 1 indicates a higher degree of association.

Figure 6:
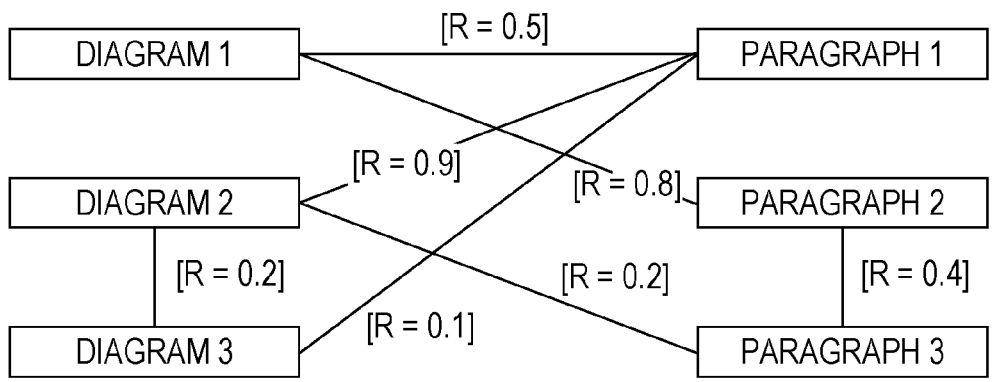
FIG. 6 is a diagram illustrating example associations among components.

FIG. 6 is a schematic diagram illustrating example associations among components. As illustrated in FIG. 6, components associated with one another are connected by using solid lines. Degrees of association R among the associated components are illustrated.

Figure 7:
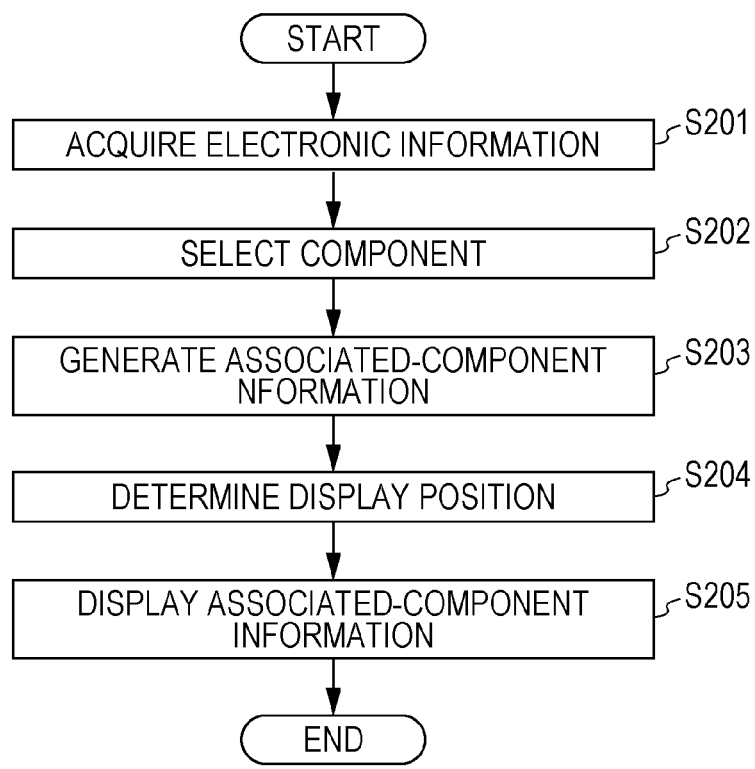
FIG. 7 is a diagram illustrating an example flow of a process performed by the information processing apparatus according to the exemplary embodiment of the present invention.

An example flow of a process of displaying associated components in response to selection of a component in an electronic document will be described with reference to the flowchart in FIG. 7.

The electronic-document acquiring unit 30 acquires electronic information 21 stored in the memory 14 of the information processing apparatus 10 in response to an instruction to obtain an electronic document from a user (S201).

In response to an instruction to select a component, which is supplied by the user (for example, using a mouse to click the component), the component selecting unit 42 selects the component specified by the user, from the components disposed in the obtained electronic information 21 (S202).

The associated-component-information generating unit 46 generates associated-component information 26 in a form based on the degree of association calculated by the degree-of-association calculating unit 40, from each of other components associated with the component selected by the component selecting unit 42 (S203).

Specifically, for example, the associated-component-information generating unit 46 sets the size of a display area in which the associated-component information 26 is displayed, in accordance with the degree of association R between each of the other components associated with the component selected by the component selecting unit 42 and the selected component, and generates the associated-component information 26 that is to be displayed in the display area.

An example form of the associated-component information 26 will be described. The associated-component-information generating unit 46 sets the size of a display area so that the associated-component information 26 for a component having a higher degree of association R is displayed in a larger display area. For example, an expression of defining the area of a display area, $S=h \cdot R$ (h is any coefficient), may be used to set the area of a display area. The component having the highest degree of association among the other components associated with the selected component is displayed without conversion. The display area for the component having the highest degree of association is used as a reference, and a smaller display area obtained by reducing the reference display area may be set to the display area for a component having a lower degree of association. Multiple display areas having different sizes may be prepared in advance, and a display area having a larger size may be selected and set to a component having a higher degree of association.

The associated-component-information generating unit 46 generates the associated-component information 26 so that the associated-component information 26 is displayed so as to fit the display area which has been set. For example, the associated-component-information generating unit 46 generates the associated-component information 26 by extracting a part of the component. Specifically, for example, the associated-component-information generating unit 46 extracts a characteristic character string representing the description in the component, from the component. That is, a sentence is extracted which summarizes the paragraph and which starts with "In short", "To sum up", or the like. Alternatively, a summary of the description in the component may be generated, or the subject matter representing the description in the component may be extracted. When the component is a picture area, the associated-component-information generating unit 46 generates a thumbnail image of the figure, the image, or the like included in the picture area, and uses it as the associated-component information 26. Thus, information for grasping the description of the component may be displayed even in a small display area.

A correspondence between the degree of association R and the form of associated-component information 26 may be defined in advance. For example, when 1>R>x1 (for example, x1=0.8), associated-component information 26 is generated from the component without conversion. When x1≥R>x2 (for example, x2=0.4), a characteristic character string which represents the description of the component is extracted from the component as the associated-component information 26. Alternatively, a summary of the description in the component is generated as the associated-component information 26. When x2≥R>0, the subject matter representing the description in the component is extracted as the associated-component information 26.

The form of associated-component information 26 is not limited to the above-described examples. For example, the associated-component-information generating unit 46 may change the display color or the thickness of a display line in associated-component information 26 on the basis of the degree of association R. Specifically, starting from a component having the highest degree of association R to a component having the lowest degree of association R, the density of the display color of associated-component information 26 is decreased or increased. Alternatively, starting from a component having the highest degree of association R to a component having the lowest degree of association R, the thickness of a display line in associated-component information 26 is decreased or increased. The change of the display color or a display line may be made on a character string or a line in a diagram, which is included in the associated-component information 26, or may be made on the background or a frame border of the associated-component information 26.

The display-position determining unit 48 determines a position at which the associated-component information 26 generated by the associated-component-information generating unit 46 is to be displayed, on the basis of the position of the selected component (S204).

The display-position determining unit 48 determines a position at which the associated-component information 26 is to be displayed, on the basis of the position of the component selected by the component selecting unit 42 in the electronic document, the size of the component, or the size of the display area in which the associated-component information 26 generated by the associated-component-information generating unit 46 is to be displayed. For example, the position of the associated-component information 26 is determined so that the associated-component information 26 does not overlap the selected component and that the associated-component information 26 is located as close as possible to the component. The associated-component information having the highest degree of association is moved along the periphery of the selected component, and the associated-component information is displayed at a position at which the associated-component information does not overlap the outer frame of the electronic information 21. Then, the associated-component information having the second-highest degree of association is moved along the periphery of the display area for the associated-component information having the highest degree of association, and the associated-component information is displayed at a position at which the associated-component information does not overlap the outer frame of the electronic information 21. When other associated-component information is present, the display position of the associated-component information is determined in descending order of the degree of association by using a method similar to the above-described method.

The associated-component information 26 generated by the associated-component-information generating unit 46 is displayed at a position determined by the display-position determining unit 48 (S205). FIG. 3 is a diagram illustrating an example display of the associated-component information 26 in the electronic information 21. As illustrated in FIG. 3, the display area for the associated-component information 26 is rectangular, but is not limited to this shape. For example, the display area may be, for example, circular or elliptic.

A user selects a piece of displayed associated-component information 26 (for example, using a mouse to click the piece of associated-component information 26), whereby the entire information of the component which is the source of the piece of the associated-component information 26 is displayed. In the state in which the associated-component information 26 is displayed, the user performs, for example, a selecting operation on the selected component again, whereby the original electronic information 21 in which the associated-component information 26 is not displayed is displayed. Alternatively, a selecting operation on the associated-component information 26 may cause the associated-component information having the second-highest degree of association to be displayed.

An exemplary embodiment of the present invention is not limited to the above-described exemplary embodiment.

For example, instead of an area for a single paragraph, a text area 24 may be an area obtained by connecting adjacent paragraphs. Alternatively, a text area 24 may be an area obtained by dividing one paragraph into multiple character strings. A picture area 22 may be an area obtained by connecting adjacent picture areas 22.

A user may select two or more components at a time. In this case, the associated-component information 26 for each of the components is displayed. In addition, the process of associating components with one another and the process of calculating the degree of association may be performed by using multiple pieces of electronic information.

In the above-described exemplary embodiment, the process of associating components with one another and the process of calculating the degree of association in the electronic information 21 are performed in advance, but this example is not limiting. For example, when a user selects a component (for example, using a mouse to click the component), other components associated with the selected component may be extracted, and the degrees of association among the components may be calculated.

The form of the associated-component information 26 may be such that a component reduced so as to fit a display area which has been set is displayed.

The above-described specific character strings and values, and specific character strings and values in the drawings are example, and are not limiting.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one hardware processor configured to implement:
      a selecting unit that selects at least one of a plurality of components of electronic information;
      a degree-of-association calculating unit that calculates a degree of association representing a strength of association between a different component associated with the at least one of the plurality of components selected by the selecting unit and the at least one of the plurality of components; and
      a display unit that controls a display of associated-component information by changing a display of the different component within the electronic information in proportion to the degree of association which is calculated by the degree-of-association calculating unit, the associated-component information regarding the different component which is associated with the at least one of the plurality of components,
   wherein, in a case in which the at least one of the plurality of the components comprises a description indicating a conjunctive relation with the different component, the degree-of-association calculating unit associates the at least one of the plurality of components with the different component,
   wherein the degree-of-association calculating unit obtains at least one of the plurality of components from a document by dividing a portion of the document with respect to paragraphs of the document.

2. The information processing apparatus according to claim 1,
   wherein the degree-of-association calculating unit calculates the degree of association between components including identical character strings, in such a manner that, in a case where the components include more identical character strings, a value of the degree of association between the components is calculated higher.

3. The information processing apparatus according to claim 2,
   wherein the display displays the associated-component information in a display area having a size determined in accordance with the degree of association.

4. The information processing apparatus according to claim 2,
   wherein the display displays the associated-component information by using a color determined in accordance with the degree of association.

5. The information processing apparatus according to claim 1,
   wherein the degree-of-association calculating unit calculates the degree of association between components selected in accordance with a character string representing a relation between the components and in accordance with a position of the character string.

6. The information processing apparatus according to claim 5,
   wherein the display displays the associated-component information in a display area having a size determined in accordance with the degree of association.

7. The information processing apparatus according to claim 5,
   wherein the display displays the associated-component information by using a color determined in accordance with the degree of association.

8. The information processing apparatus according to claim 1,
   wherein the display displays the associated-component information in a display area having a size determined in accordance with the degree of association.

9. The information processing apparatus according to claim 8,
   wherein, by changing an amount of the associated-component information in accordance with the degree of association, the display displays the associated-component information in such a manner that the associated-component information fits a determined size of the display area.

10. The information processing apparatus according to claim 9,
    wherein the associated-component information is information extracted from a part of the different component associated with the at least one of the plurality of components.

11. The information processing apparatus according to claim 9,
    wherein the associated-component information is a summary about the different component associated with the at least one of the plurality of components.

12. The information processing apparatus according to claim 9,
    wherein the associated-component information is information in which the different component associated with the at least one of the plurality of components is reduced and displayed.

13. The information processing apparatus according to claim 1,
    wherein the display displays the associated-component information by using a color determined in accordance with the degree of association.

14. The information processing apparatus according to claim 1,
    wherein the display displays the associated-component information in accordance with a position of the at least one of the plurality of components.

15. The information processing apparatus according to claim 1,
    wherein the conjunctive relation is either one of a parallel relation, a principal-subordinate relation, and a cause-effect relation.

16. The information processing apparatus according to claim 15,
wherein the degree-of-association calculating unit calculates the degree of association based on which description indicating conjunctive relation among the parallel relation, the principal-subordinate relation, and the cause-effect relation is included in the description indicating conjunctive relation which is included in any one of the plurality of the components.

17. The information processing apparatus according to claim 1,
wherein the degree-of-association calculating unit further extracts frequently-appearing words and frequently-appearing character strings in each of the plurality of the components, and defines the degree of association as, $R=\gamma \cdot c + \delta \cdot d$, where $\gamma$ and $\delta$ are weights, the degree of similarity among the frequently-appearing words and the frequently-appearing character strings is represented by c, and the conjunctive relation is represented by d.

18. An information processing apparatus comprising:
at least one hardware processor configured to implement:
a selecting unit that selects at least one component among a first component included in first electronic information and a second component included in second electronic information;
a degree-of-association calculating unit that calculates a degree of association representing a strength of association between the at least one component selected by the selecting unit and the second component included in the second electronic information; and
a display unit that displays associated-component information regarding the second component by changing a display of the second component within the second electronic information in proportion to the degree of association which is calculated by the degree-of-association calculating unit, the second component being associated with the at least one component and being included in the second electronic information,
wherein the degree-of-association calculating unit obtains the at least one component from a document by dividing a portion of the document with respect to paragraphs of the document.

19. A non-transitory computer readable medium storing a program causing a computer to execute a process for information processing, the process comprising:
selecting at least one of a plurality of components of electronic information;
obtaining a different component associated with at least one of the plurality of components from a document by dividing a portion of the document with respect to paragraphs of the document;
calculating a degree of association representing a strength of association between the different component and the at least one of the plurality of components; and
displaying associated-component information by changing a display of the different component within the electronic information in proportion to the calculated degree of association, the associated-component information regarding the different component associated with the selected component,
wherein, in a case in which the at least one of the plurality of the components comprises a description indicating a conjunctive relation with the different component, the at least one of the plurality of components is associated with the different component.

\* \* \* \* \*